United States Patent

[11] 3,565,407

| [72] | Inventors | Kurt Schermer;<br>Herold Jew, Benoni, Republic of<br>South Africa |
|---|---|---|
| [21] | Appl. No. | 769,132 |
| [22] | Filed | Oct. 21, 1968 |
| [45] | Patented | Feb. 23, 1971 |
| [73] | Assignee | Fried. Krupp Gesellschaft mit beschrankter Haftung<br>Essen, Germany |
| [32] | Priority | Oct. 23, 1967 |
| [33] | | South Africa |
| [31] | | 67/6338 |

[54] METHOD AND APPARATUS FOR PREHEATING SCRAP
11 Claims, 1 Drawing Fig.

[52] U.S. Cl. .................................................. 263/27, 263/40
[51] Int. Cl. ................................................. F27b 19/00
[50] Field of Search .................................... 263/27, 40, 43

[56] References Cited
UNITED STATES PATENTS

| 1,815,890 | 7/1931 | Brockway.................. | 263/27 |
| 2,458,624 | 1/1949 | Morton et al. ............. | 263/40 |
| 2,718,096 | 9/1955 | Henry et al. ............... | 263/27X |
| 3,190,625 | 6/1965 | Brichard et al. ........... | 263/27X |
| 3,390,872 | 7/1968 | Ciochetto................... | 263/40X |
| 3,459,411 | 8/1969 | Jacobs........................ | 263/40X |

*Primary Examiner*—Charles J. Myhre
*Attorney*—Spencer & Kaye

ABSTRACT: Method for preheating scrap to be charged into an electric arc furnace for melting and apparatus for performing such method. Fumes from the furnace are drawn off together with sensible and chemical heat contained therein. The fumes are then passed through a quantity of scrap prior to being charged into said furnace as a consequence of which the heat in the fumes is utilized to preheat the scrap. Various control means and sensing means are used in conjunction with the apparatus in order to maintain the pressure and temperature of the fumes at desired levels.

PATENTED FEB 23 1971
3,565,407
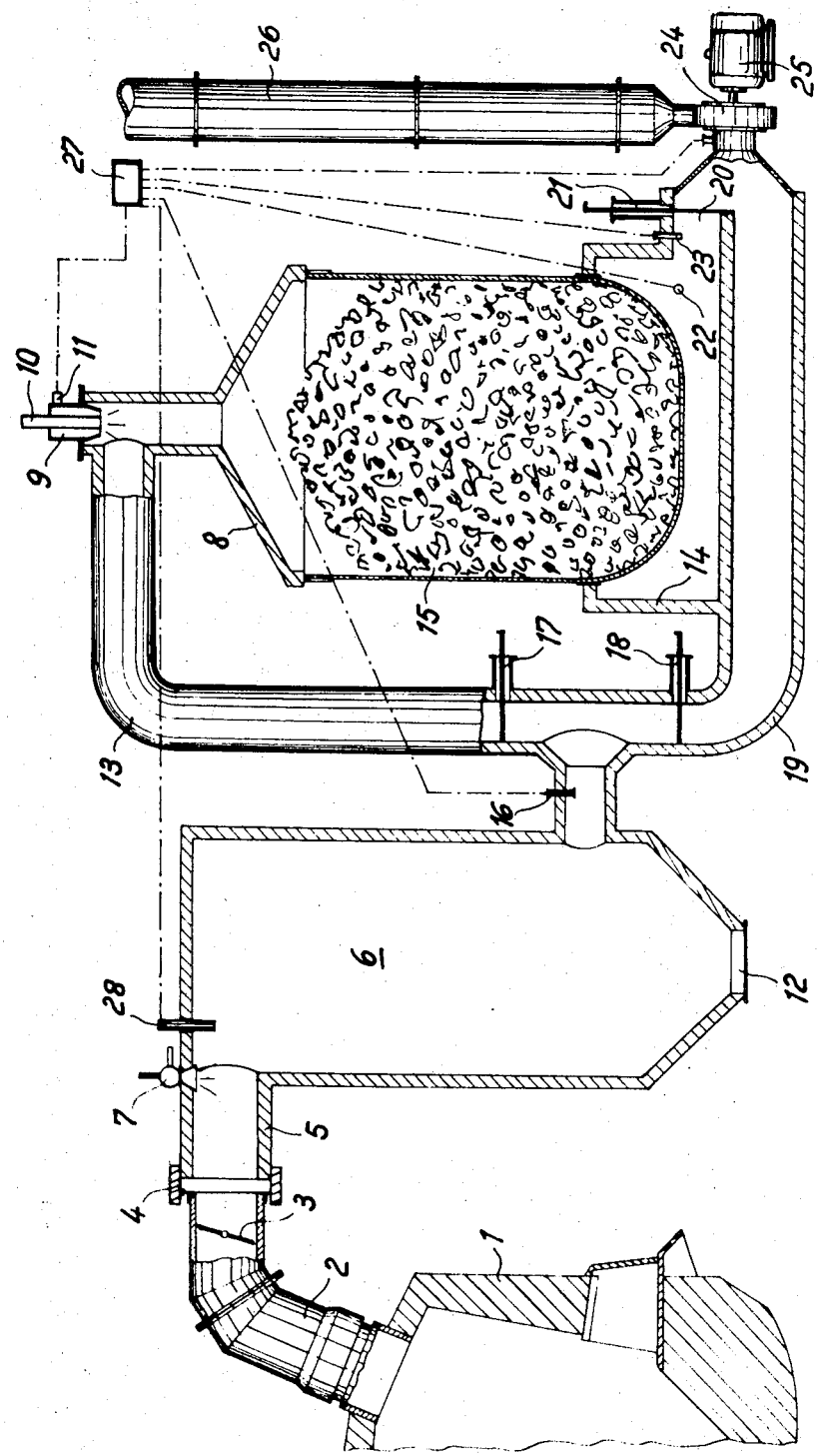
Inventors
Kurt Schermer
Herold Jew
By: Spencer & Kaye
Attorneys

3,565,407

METHOD AND APPARATUS FOR PREHEATING SCRAP

SUMMARY OF THE INVENTION

This invention relates to a method and the apparatus or means for preheating of scrap for electric arc furnaces.

The preheating of scrap before charging into electric arc furnaces to save on melting current and to speed up the melting down of the scrap within the furnace is known but the present invention provides for improvements of the method and also improvements of apparatus or means for carrying out the improved method.

According to the invention the method for preheating of scrap for electric arc furnaces includes the utilization of sensible and chemical heat inherent in fumes leaving the arc furnace for the preheating of the scrap.

The method for preheating of scrap for electric arc furnaces also provides for the development of or creating additional heat by extraneous means to compensate or equalize fluctuations in the amount of heat available in the fumes leaving an arc furnace at various stages of the melting process. The development or creation of additional heat by extraneous means is preferably automatically controlled to provide a definite predetermined desired constant level of heat available for the purpose of preheating of scrap.

The fumes which leave the electric arc furnace vary in composition, quantity and temperature during the various stages of operation, but constitute at any phase of the electric arc furnace operation a considerable thermal loss because of their content of sensible heat and combustible gas, which is mainly carbon monoxide.

The apparatus to carry out the preheating of scrap for electric arc furnaces according to the aforesaid method includes a combustion chamber for receiving the fumes leaving the arc furnace, a supporting stand for a scrap charging basket, a hood for mounting over the basket and a suction system for drawing the fumes from the arc furnace and through the combustion chamber, the hood, scrap charging basket and the stands.

The apparatus also includes a control unit receiving signals from a thermocouple disposed after the combustion chamber and adapted to energize the control unit to enable the control unit to regulate temperatures within the combustion chamber. A control unit is also provided and adapted to receive signals from a pressure-sensing means enabling the control unit to regulate the operation of the suction system.

The apparatus includes a fuel burner, which may be placed anywhere in the duct means connecting the combustion chamber to the furnace and the scrap basket. The burner is adapted to keep the total heat available for preheating of the scrap within the basket at a substantially constant desired or predetermined level and compensates for the fluctuations in quantity, composition and temperatures of fumes emitted from the furnace as are experienced at the various stages of operation of an electric arc furnace.

For the invention to be more clearly understood, reference will now be made to the accompanying sheet of drawings which illustrates, by way of example, a form of the apparatus suitable for preheating of scrap for electric arc furnaces.

BRIEF DESCRIPTION OF THE DRAWING

The sole FIGURE of the drawing, is a schematic cross-sectional view along the center line of an arc furnace and the preheating apparatus according to the present invention.

DESCRIPTION OF THE PREFERRED EMBODIMENT

Referring to the drawing, reference numeral 1 denotes a portion of an electric arc furnace provided with a duct-forming vent 2 in which a damper 3 is operatively disposed. The vent 2 connects by means of a slip gap 4 with a connecting duct 5 extending to a combustion chamber 6. In the connecting duct 5 a pilot burner 7 and a pressure probe 28 are mounted.

The apparatus further provides a hood 8 with which is associated a burner 9. To the burner 9 a fuel line 10 and an air line 11 are connected. A covered manhole 12, for dust removal, is provided in the bottom of the combustion chamber 6 while a lower region of the combustion chamber 6 is connected by a duct 13 to the hood 8.

Below the hood 8 a supporting stand 14 is provided for a scrap-receiving charging basket 15 while the hood 8 is adapted to engage over the top of the basket 15.

A thermocouple 16 is provided at the connection of duct 13 with the combustion chamber 6 while a damper 17 is provided in the duct 13. A damper 18 is provided in a duct 19. Duct 19 is connected to duct 13 at the position of connection of duct 13 with the combustion chamber 6. A further duct 20 extends from the supporting stand 14 and communicates with an intake of a suction fan 24. Also connected to the intake of the suction fan 24 is the duct 19. The fan 24 is connected to an electric motor 25 while the outlet of the fan connects to a stack 26.

Within the supporting stand 14 a pressure probe 22 is disposed, while in the duct 20 a thermocouple 23 is positioned. At the outlet of duct 20 a damper 21 is provided.

A control unit 27 is disposed at a convenient position and is connected to the aforesaid thermocouple 16, burner 9, pressure probes 22 and 28, thermocouple 23 and the fan 24.

Damper 3 is adapted to regulate, in a known way, desired pressure within the furnace 1. Fumes leaving the furnace 1 pass the pilot burner 7 where ignition of the combustible contents of the fumes is ensured. The necessary combustion air is entrained through the slip gap 4 due to the negative pressure existing at such region and created by the action of the suction fan 24.

By means of the negative pressure created by the suction fan 24, the fumes from the furnace are drawn through the combustion chamber 6, duct 13, hood 8 and through the scrap in the basket 15 and are finally discharged into the stack 26. Dampers 17 and 21, for drawing of the fumes through the scrap are open while damper 18 in duct 19 is closed.

The thermocouple 23 transmits signals, relating to the temperature in the connecting duct 20, to the control unit 27 which is adapted to control the burner 9 in accordance with the signals received from the thermocouple 23. On the control unit a certain predetermined or desired temperature range is set and the control unit is adapted to admit fuel and combustion air to the burner 9 if the temperature in the connecting duct 20 is below the desired level and will shut off fuel and air when the temperature is above such desired level.

Further control signals are transmitted from the pressure probes 22 and 28 for causing the positions of vanes on the fan inlet to be altered as the quantity of fumes to be removed changes and whereby constant draft conditions are ensured.

Thermocouple 16, associated with the combustion chamber, is adapted to transmit signals through control unit 27 to a servo control motor operating vanes, thus avoiding overheating or entrainment of excess air leading to excessive cooling of the combustion chamber 6.

When the charging basket, which stands on the preheating supporting stand 14, has been preheated and is required for charging of the furnace 1, the damper 18 is opened whereafter dampers 17 and 21 are closed so that the fumes are now drawn directly to the stack 26. The hood 8 is then swung aside and the basket 15, with its contents, can then be lifted from the stand 18. After a further basket for preheating has been placed on the supporting stand 14 and the hood 18 placed thereover, the dampers 17 and 21 are opened and damper 18 closed.

It will be understood that the above description of the present invention is susceptible to various modifications, changes and adaptations.

We claim:

1. A method for preheating of scrap to be charged into an electric arc furnace for melting comprising the steps of:

a. drawing off the fumes, together with the sensible and chemical heat contained therein, generated in said electric arc furnaces in melting scrap;
b. converting the chemical heat in the fumes to sensible heat; and
c. passing said fumes through a quantity of scrap prior to being charged into said furnace as a consequence of which the heat in said extraneously applied fumes is utilized to preheat said scrap.

2. A method as defined in claim 1 further comprising the step of applying additional heat to said fumes by extraneous means provided therefor in order to equalize the fluctuations in the amount of heat available in the fumes at various stages of scrap melting.

3. A method as defined in claim 2 wherein said step of applying additional heat is accompanied by the step of automatically controlling the heat generated by said extraneous means by sensing of the pressure and temperature of the fumes before and after being passed through the scrap, thereby to provide a definite, desired constant level of heat available for the purpose of preheating the scrap.

4. Apparatus for preheating scrap prior to being charged into an electric furnace comprising, in combination:
    a. a combustion chamber connected by a duct to the arc furnace, said combustion chamber receiving the heated fumes leaving the arc furnace;
    b. a hood connected to said combustion chamber by a duct;
    c. a stand for supporting a scrap-charging basket, said basket defining a connecting channel between said hood and said supporting stand through which the fumes from said combustion chamber flow; and
    d. suction means connected to said combustion chamber via a duct connected to said supporting stand, when said scrap charging basket is positioned for support on said stand, said suction means providing a constant negative pressure in the apparatus which draws the fumes generated in the arc furnace through the combustion chamber, hood, charging basket and supporting stand, in that order, thereby to cause preheating of the scrap in the charging basket.

5. Apparatus as defined in claim 4 wherein said suction means includes a fan.

6. Apparatus as defined in claim 4 further comprising a burner located along the duct connecting said hood to said combustion chamber, said burner adding heat to said fumes, as required, prior to the passing of the fumes through the hood and scrap charging basket.

7. Apparatus as defined in claim 4 further comprising control means for regulating the temperature in the apparatus, said control means being connected to said burner for controlling the same; and at least two thermocouples connected to said control means for signalling said control means of temperature conditions sensed, said control means responding to such signals by appropriately regulating said burner.

8. Apparatus as defined in claim 7 wherein one of said two thermocouples is located between said combustion chamber and said scrap charging basket and the other one of said thermocouples is located in the duct connecting said supporting stand to said suction means.

9. Apparatus as defined in claim 8 further comprising at least two pressure sensing devices, said pressure-sensing devices being connected to said control means for signalling said control means of pressure conditions sensed, said control responding to such signals by appropriately regulating said fan so as to provide a constant negative pressure in said apparatus.

10. Apparatus as defined in claim 9 wherein one of said pressure sensing devices is located in said combustion chamber and one of said pressure sensing devices is located in said duct connecting the suction means to said supporting stand.

11. Apparatus for preheating scrap steel prior to being charged into an electric arc furnace, comprising, in combination:
    a. a combustion chamber;
    b. a duct connecting said combustion chamber to the arc furnace so that said combustion chamber receives heated fumes from the arc furnace;
    c. a hood;
    d. a duct connecting said hood to said combustion chamber;
    e. a scrap charging basket;
    f. a stand for supporting said scrap charging basket so that a flow path for the fumes is defined from said hood through said basket to said stand; and
    g. suction means connected to said stand for providing a constant negative pressure to draw the fumes generated in the arc furnace through said combustion chamber, said hook, said charging basket and said supporting stand, in that order, to cause preheating of the scrap in said charging basket.